United States Patent

Bridger

[15] 3,665,038

[45] May 23, 1972

[54] PROCESS FOR PREPARING CARBON-CARBON COUPLED DIMERS OF N-ARYLNAPHTHYLAMINES

[72] Inventor: Robert F. Bridger, Hopewell, N.J.

[73] Assignee: Mobil Oil Corporation

[22] Filed: June 12, 1969

[21] Appl. No.: 832,859

[52] U.S. Cl..............................260/576, 252/50, 252/401, 260/45.9, 260/571, 260/398.5
[51] Int. Cl.....................................C07c 87/64, C07c 87/66
[58] Field of Search...........................................260/576, 571

[56] References Cited

UNITED STATES PATENTS 3,509,214   4/1970   Braid et al. ............................260/576

*Primary Examiner*—Joseph Rebold
*Assistant Examiner*—C. F. Warren
*Attorney*—Oswald G. Hayes, Andrew L. Gaboriault, Raymond W. Barclay and Claude E. Setliff

[57] ABSTRACT

Carbon-carbon coupled dimers of N-arylnaphthylamines are prepared by thermally decomposing an N-nitroso-N-arylnaphthylamine. The aryl portion of such material may be phenyl, naphthyl or an alkyl-, alkoxy- or halogen-substituted member of these.

The compounds thus produced are useful as antioxidants for a variety of organic materials. These include polyurethane and polyolefin polymers as well as lubricating oils.

7 Claims, No Drawings

PROCESS FOR PREPARING CARBON-CARBON COUPLED DIMERS OF N-ARYLNAPHTHYLAMINES

The compounds thus produced are useful as antioxidants for organic compositions.

BACKGROUND OF THE INVENTION

1. Field Of The Invention

This invention relates to the preparation of the dimers of N-arylnaphthylamines. More particularly, it relates to the production of such dimers which are carbon-carbon coupled by heating the appropriate nitrosamine in an inert organic solvent in the absence of oxidizing conditions.

2. Description Of The Prior Art

Dimers of carbon-carbon coupled N-arylnaphthylamines may be prepared by oxidizing the monomeric N-arylnaphthylamines with metal-containing oxidants, such as potassium permanganate. However, the dimers produced are sensitive to oxidants and may, to a large extent, be oxidized to tars under the conditions used in the permanganate synthesis procedure.

Wieland et al., Ann., 392, 156–169 (cf. C.A. 7, 596), reported the decomposition of N-nitroso-N,N-ditolylamine in toluene. Such decomposition was carried out under oxidizing conditions, however, and ditolylamine was obtained rather than the corresponding carbon-carbon coupled dimer.

SUMMARY OF THE INVENTION

In accordance with the invention, there is provided a method of producing carbon-carbon coupled dimers of N-arylnaphthyl-amines comprising the step of thermally decomposing an N-nitroso-N-arylnaphthylamine in an inert organic solvent in the absence of oxidizing conditions.

The compounds produced by the process of this invention are useful as antioxidants for organic compositions susceptible to oxidative deterioration.

SOME SPECIFIC ASPECTS OF THE INVENTION

The nitrosamines useful in the invention correspond to the formula

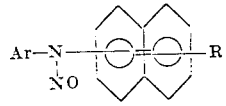

wherein Ar is a member of the group consisting of phenyl, naphthyl, and the substituted members thereof, where such substituent is selected from the group consisting of alkyl of from one to about 16 carbon atoms, alkoxy of from one to about 14 carbon atoms, and halogen (e.g., chlorine, bromine and fluorine), and R is hydrogen or the same as the substituents named already. The substituents may be in only one position of the aryl rings, or they may be present up to all available positions thereon.

Examples of inert organic solvents which may be used are xylene, chlorobenzene, bromobenzene, cumene, the high boiling paraffins, and so forth. Since the compounds produced are effective as antioxidants in lubricating compositions, it may be desirable to prepare them directly in the lubricant medium. That is to say, the lubricating oil itself may be used as the solvent.

In general, it can be said that any solvent (preferably those which are high boiling, i.e., those having boiling points in the range of reaction temperatures stated below) may be employed so long as the reactants are soluble therein, it has a sufficiently high boiling point, and, except when the solvent is to be used as the lubricant, it allows easy separation of the product therefrom.

Another aspect of the invention, as already stated, is that oxidizing conditions are excluded. This generally involves the elimination of air from the reaction vessel, and can be accomplished by passing an inert gas into the reaction medium as the reaction proceeds. Illustrative of such gases are nitrogen, carbon dioxide, helium and methane. Others may also be used, but it is not believed necessary to set forth at this point a long list of inert gases which the art may employ. From the general and specific description of this invention, the art will have no difficulty in selecting the proper inert gases.

The temperature of reaction is not a critical consideration, except that lower temperatures require correspondingly longer reaction times. The reaction proceeds at a satisfactory rate at about 75° C.; the rate will gradually increase up to a temperature of about 300° C. Above that temperature, no appreciable increase in reaction rate will be observed and the danger of decomposition of the primary product becomes greater. In this 75°–300° C. range, it has been found that the best results are obtained at from about 100° C. to about 200° C.

The compounds of the invention are antioxidants for a variety of organic compositions, including polyurethane and polyolefin polymers, GR-S rubbers, and the like. Also included are lubricating oils, such as mineral oils, both paraffinic and naphthenic, polyolefin fluids, acetals and siloxanes, as well as the synthetic ester fluids. The ester fluids are of specific interest, and embrace those made from dicarboxylic acids and monohydric alcohols, such as di(2-ethylhexyl) sebacate or -azelate, as well as those from a monocarboxylic acid and a polyhydric alcohol. Among the latter are those esters prepared from a technical grade pentaerythritol (containing about 12 percent of dipentaerythritol) and a mixture of equal parts of isovaleric and pelargonic acids.

Having described the invention in general terms, the following Examples will give specific methods of practicing same. It will be understood that the illustrative Examples are not intended to limit the scope of the invention. "Parts" are parts by weight.

DESCRIPTION OF SPECIFIC EMBODIMENTS

EXAMPLE 1

Preparation of 1,1'-bis(N-phenyl-2-naphthylamine) from N-nitroso-N-phenyl-2-naphthylamine

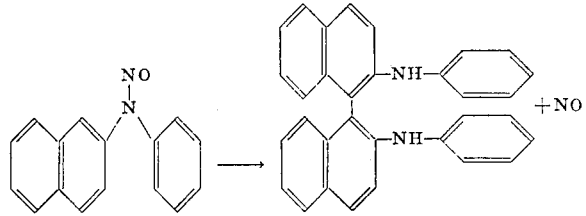

A solution of N-nitroso-N-phenyl-2-naphthylamine (2 parts) in xylene (50 ml) was heated eight hours at 130° C. under a stream of nitrogen. The xylene was removed by distillation under a stream of nitrogen. The crude product was dissolved in 40 ml benzene and treated fifteen minutes with anhydrous hydrogen chloride. The precipitated hydrochloride was hydrolyzed by stirring 30 minutes in a mixture of 50 ml of benzene and 50 ml of water. After removal of the water and drying, the solution was evaporated until the product began to crystallize. Filtration gave 0.68 part (39 percent) of 1,1'-bis(N-phenyl-2-naphthylamine) having a melting point of 162°–166° C. The mixed melting point with an authentic specimen was 168°–170° C. The infrared spectrum was identical with that of an authentic sample.

EXAMPLE 2

Preparation of 1,1'-bis(di-2-naphthylamine) from N-nitroso-di-2-naphthylamine

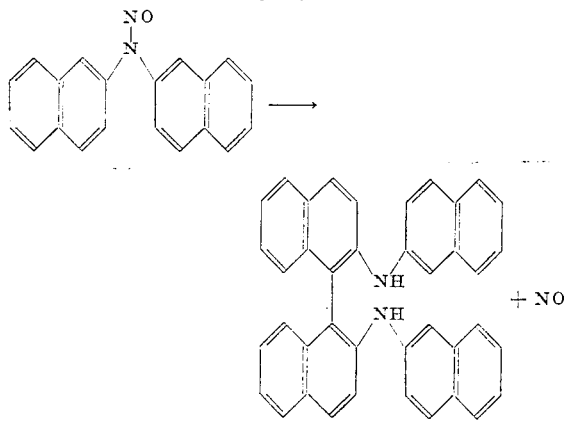

A solution of N-nitroso-di-2-naphthylamine (6 parts) in 100 ml of xylene was heated for two hours at 130° C. under a stream of nitrogen. The xylene was removed by distillation, and the residue was dissolved in 40 ml benzene. On standing at room temperature for sixteen hours, 1.264 parts (23 percent yield) of 1,1'-bis(di-2-naphthylamine) crystallized from the solution. The product was filtered and dried. It had a melting point of 278°–281° C. The mixed melting point with an authentic specimen was 280°–283° C. The infrared spectrum was identical with that of an authentic sample.

EXAMPLE 3

This Example illustrates the preparation of the compounds of this invention in a lubricating oil medium. About 0.04 mole per kg (0.99 percent weight) of N-nitroso-N-phenyl-1-naphthylamine was placed in a pentaerythritol ester prepared from technical grade pentaerythritol and a mixture of equal parts of isovaleric and pelargonic acids. The solution thus prepared was heated at 130° C. in a stream of nitrogen, while stirring, for a period of 6 hours.

EVALUATION OF THE PRODUCTS

Antioxidant Test

This test is conducted in an oxygen circulation apparatus of the type described by Dornte (Ind. Eng. Chem., 28, 26–30, 1936), modified so that the rate of oxygen adsorption can be recorded automatically. In general, a tube containing 30 grams of an organic sample and the additive is placed in a thermostated heater. After thermal equilibrium is established at the desired temperature, the sample tube is connected with the closed oxygen circulation system. Oxygen is circulated through a fritted glass disk near the bottom of the sample tube at the rate of 5 liters per hour. The time required for the adsorption of one mole of oxygen per kg of sample is taken as the inhibition period. The longer the inhibition period, the greater is the oxidation resistance of the sample.

In accordance with the procedure described, 30 grams of the lubricant-dimer solution of Example 3 was heated to 195° C. Oxygen was passed through this solution at the specified rate of 5 liters per hour. The time required for the adsorption of 1 mole of oxygen per kg of oil was 38.6 hours. In the absence of dimers, i.e., only the neat pentaerythritol ester, the lubricant adsorbed 1 mole of oxygen per kg of liquid in 1.2 hour. In the same manner, the products of Examples 1 and 2 were tested in the pentaerythritol ester fluid at 175° C. with 5 liters of oxygen per hour. Results are summarized below.

| Example | Additive | Concentration Weight percent | Mol./kg. | Inhibition period, hours |
|---|---|---|---|---|
| 1 | 1,1'-Bis(N-phenyl-2-naphthylamine). | 0.87 | 0.02 | 310. |
| 2 | 1,1'-Bis(di-2-naphthylamine). | 0.54 | 0.01 | 155. |
|  | None (base fluid only) |  |  | 1.6 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

1. A process for producing a carbon-carbon coupled dimer of an N-arylnaphthylamine comprising the step of decomposing an N-nitroso-N-arylnaphthylamine compound at a temperature of from about 75° to about 300° C. in an inert solvent and under inert conditions, the said compound having the formula

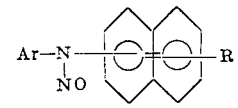

wherein Ar is a member of the group consisting of phenyl and naphthyl and R is hydrogen.

2. The process of claim 1 in which the compound used is N-nitroso-N-phenyl-2-naphthylamine and the dimer produced is 1,1'-bis(N-phenyl-2-naphthylamine).

3. The process of claim 1 in which the compound used is N-nitroso-di-2-naphthylamine and the dimer produced is 1,1'-bis(di-2-naphthylamine).

4. The process of claim 1 in which the compound used is N-nitroso-N-phenyl-1-naphthylamine and the dimer produced is 4,4'-bis(N-phenyl-1-naphthylamine).

5. The process of claim 1 wherein the temperature is from about 100° C. to about 200° C.

6. The process of claim 1 in which the solvent is xylene.

7. The process of claim 1 in which the solvent is a pentaerythritol ester.

* * * * *